(12) United States Patent
Wilairat et al.

(10) Patent No.: US 9,568,997 B2
(45) Date of Patent: Feb. 14, 2017

(54) EYE TRACKING ENABLED SMART CLOSED CAPTIONING

(71) Applicant: Microsoft Technology Licensing, LLC, Redmond, WA (US)

(72) Inventors: Weerapan Wilairat, Sammamish, WA (US); Vaibhav Thukral, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 148 days.

(21) Appl. No.: 14/225,181

(22) Filed: Mar. 25, 2014

(65) Prior Publication Data

US 2015/0277552 A1    Oct. 1, 2015

(51) Int. Cl.
| | |
|---|---|
| *H04N 5/92* | (2006.01) |
| *H04N 9/80* | (2006.01) |
| *G11B 27/00* | (2006.01) |
| *G06F 3/01* | (2006.01) |
| *H04N 5/85* | (2006.01) |
| *G11B 27/34* | (2006.01) |

(Continued)

(52) U.S. Cl.
CPC ............... *G06F 3/013* (2013.01); *G11B 27/28* (2013.01); *G11B 27/34* (2013.01); *H04N 5/85* (2013.01); *H04N 21/4223* (2013.01); *H04N 21/4884* (2013.01); *G06F 2203/04804* (2013.01)

(58) Field of Classification Search
CPC .............. H04N 5/92; H04N 9/80; H04N 5/93; G11B 27/00

USPC .......................... 386/244, 239, 278, 280, 282
See application file for complete search history.

(56) References Cited

U.S. PATENT DOCUMENTS

| | | | |
|---|---|---|---|
| 5,283,560 | A | 2/1994 | Bartlett |
| 5,648,789 | A | 7/1997 | Beadles et al. |

(Continued)

FOREIGN PATENT DOCUMENTS

| | | |
|---|---|---|
| EP | 0903662 A2 | 3/1999 |
| GB | 2467898 A | 8/2010 |

(Continued)

OTHER PUBLICATIONS

Eye Tracking Research Global, "Human-Computer Interaction and Eye Tracking", Published on: Jan. 27, 2013, Retreived at: http://www.tobii.com/en/eye-tracking-research/global/research/human-computer-interaction/, 5 pages.

(Continued)

*Primary Examiner* — Daquan Zhao
(74) *Attorney, Agent, or Firm* — Jessica Meyers; Sandy Swain; Micky Minhas

(57) ABSTRACT

Systems and methods for controlling closed captioning using an eye tracking device are provided. The system for controlling closed captioning may comprise a display device, a closed captioning controller configured to display closed captioning text for a media item during playback on the display device, and an eye tracking device configured to detect a location of a user's gaze relative to the display device and send the location to the closed captioning controller. The closed captioning controller may be configured to recognize a predetermined gaze pattern of the user's gaze and, upon detecting the predetermined gaze pattern, partially or completely deemphasize the display of the closed captioning text.

18 Claims, 9 Drawing Sheets

(51) Int. Cl.
*G11B 27/28* (2006.01)
*H04N 21/488* (2011.01)
*H04N 21/4223* (2011.01)
*H04N 5/93* (2006.01)

(56) References Cited

U.S. PATENT DOCUMENTS

| | | | |
|---|---|---|---|
| 5,898,423 | A | 4/1999 | Tognazzini et al. |
| 6,886,137 | B2 | 4/2005 | Peck et al. |
| 7,120,880 | B1 | 10/2006 | Dryer et al. |
| 7,284,201 | B2 | 10/2007 | Cohen-Solal |
| 7,561,143 | B1 | 7/2009 | Milekic |
| 8,292,433 | B2 | 10/2012 | Vertegaal |
| 8,854,447 | B2 * | 10/2014 | Conness et al. ............ 348/78 |
| 9,256,784 | B1 * | 2/2016 | Taylor ............ G06K 9/00597 |
| 2011/0084897 | A1 * | 4/2011 | Manoharan et al. ........ 345/156 |
| 2012/0131491 | A1 | 5/2012 | Lee |

FOREIGN PATENT DOCUMENTS

| | | |
|---|---|---|
| GB | 2490868 A | 11/2012 |
| GB | 2504492 A | 2/2014 |
| WO | 2013118387 A1 | 8/2013 |
| WO | 2013133618 A1 | 9/2013 |
| WO | 2013168173 A1 | 11/2013 |
| WO | 2013183206 A1 | 12/2013 |
| WO | WO 2013183206 A1 * | 12/2013 |

OTHER PUBLICATIONS

Corcoran, et al., "Real-Time Eye Gaze Tracking for Gaming Design and Consumer Electronics Systems", in IEEE Transactions on Consumer Electronics, vol. 58, Issue 2, May, 2012, 9 pages.

Yoon, Andrew, "Valve Expresses Interest in Eye Tracking, Improving Experience for Able and Disabled Gamers", Published on: Dec. 26, 2010, Retreived at: http://www.joystiq.com/2010/12/26/valve-expresses-interest-in-eye-tracking-improving-experience-f/, 2 pages.

Lee, et al., "Gaze Tracking System at a Distance for Controlling IPTV", in IEEE Transactions on Consumer Electronics, vol. 56, Issue 4, Nov. 2010, 7 pages.

Jensema, Carl, et al., "A Study of the Eye Movement Strategies Used in Viewing Captioned Television", in the Report of Institute for Disabilities Research and Training, Oct. 10, 2000, 21 pages.

ISA European Patent Office, International Search Report and Written Opinion Issued in Application No. PCT/US2015/021619, Jul. 24, 2015, WIPO, 21 pages.

IPEA Europen Patent Office, International Preliminary Report on Patentability in PCT Application No. PCT/US2015/021619, Jun. 10, 2016, WIPO, 9 pages.

IPEA European Patent Office, Second Written Opinion Issued in Application No. PCT/US2015/021619, Dec. 3, 2015, WIPO, 9 Pages.

\* cited by examiner

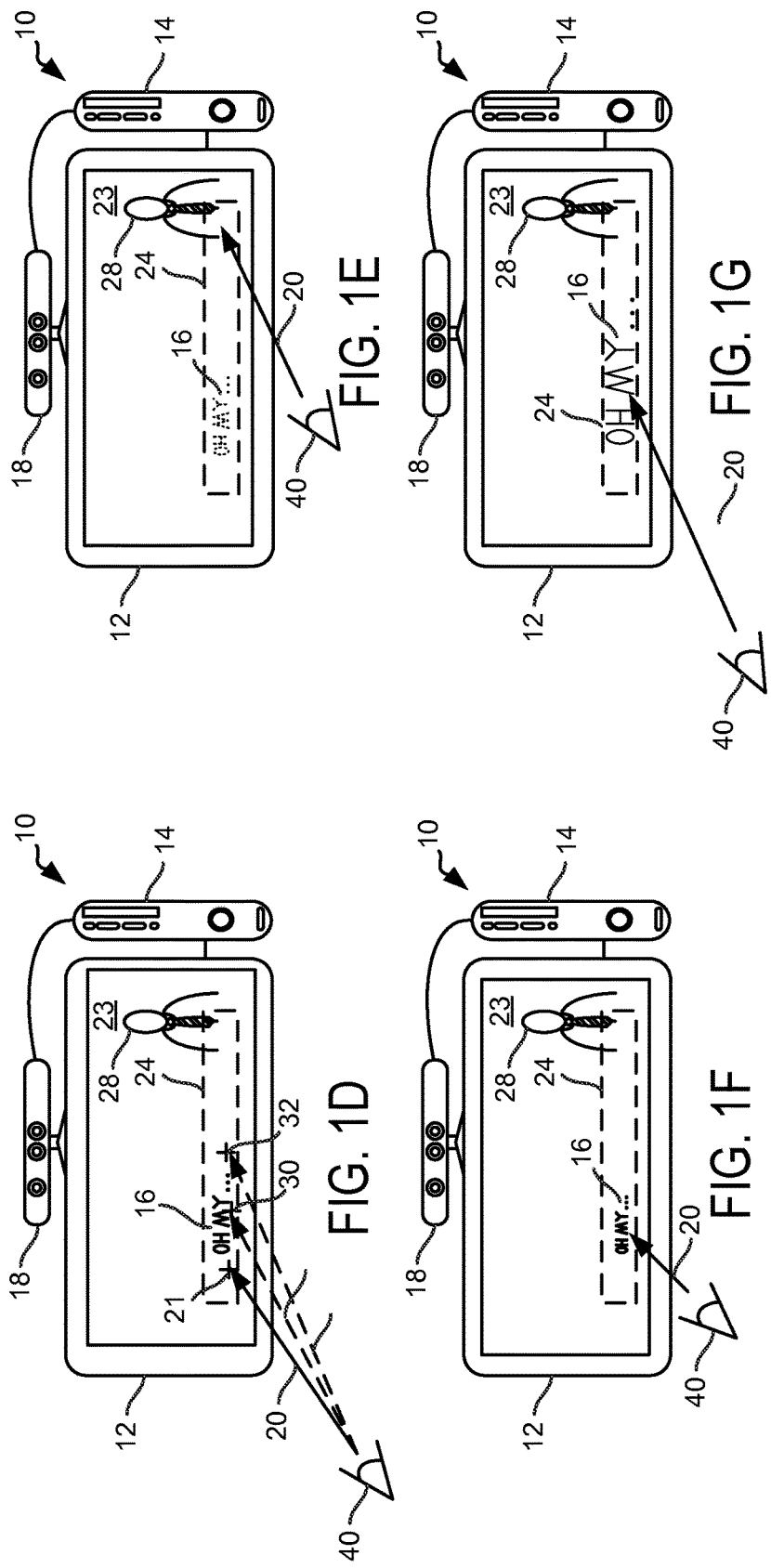

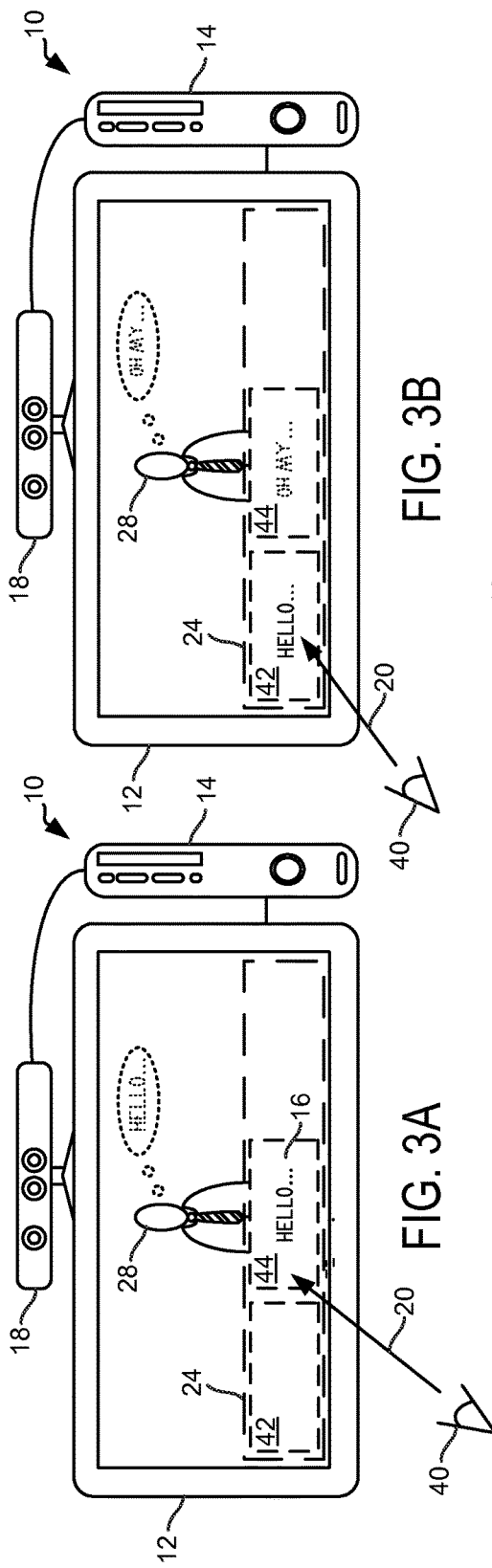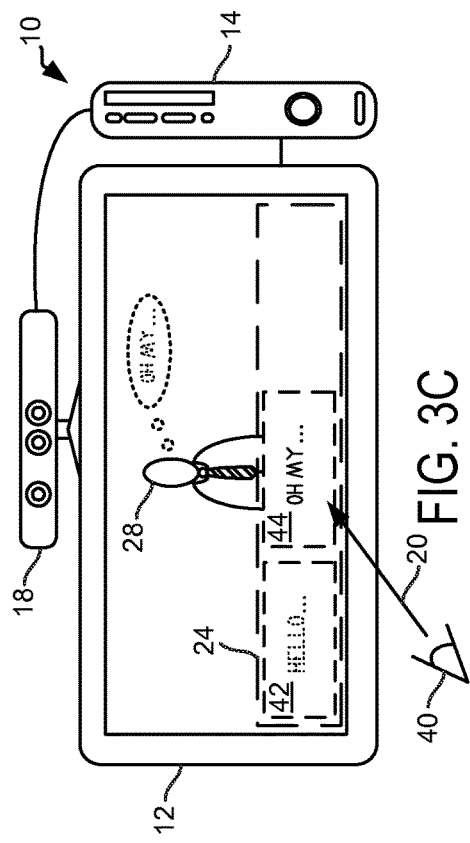

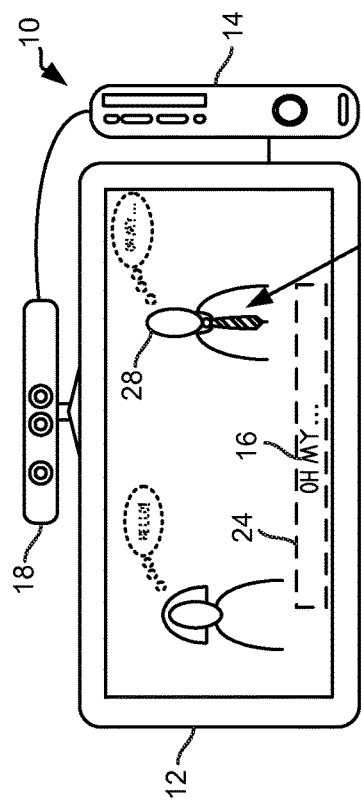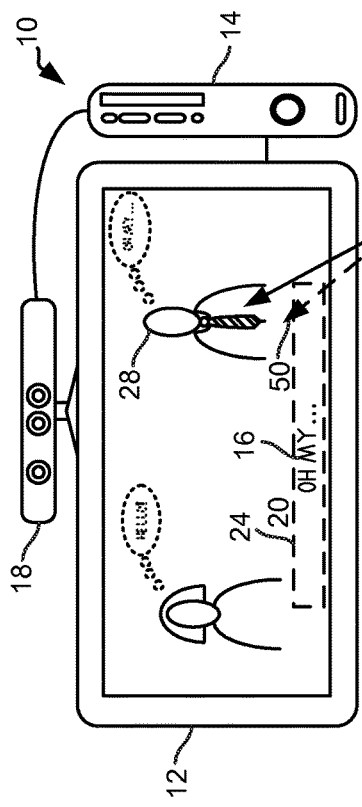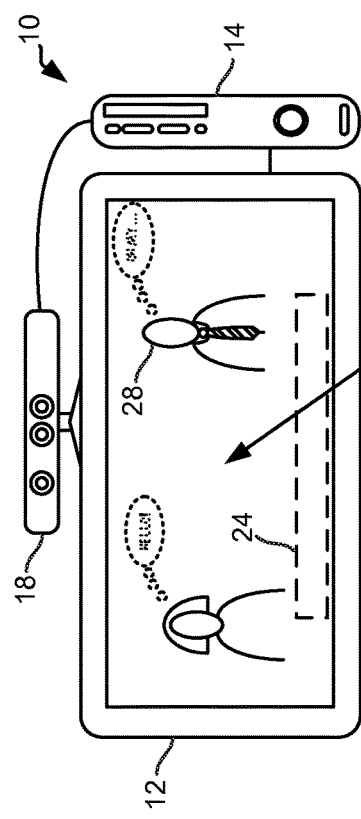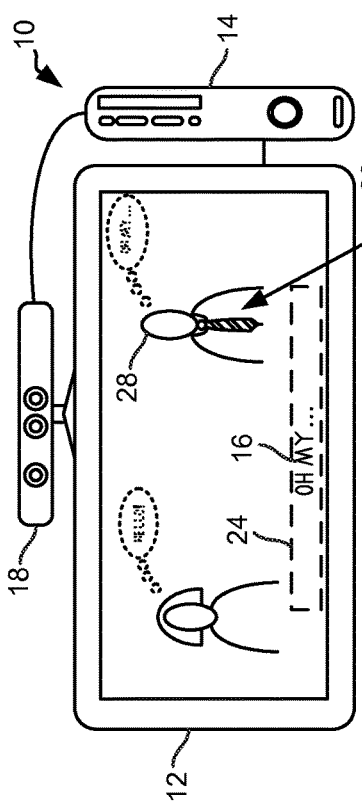
FIG. 4A
FIG. 4B
FIG. 4C
FIG. 4D

EYE TRACKING ENABLED SMART CLOSED CAPTIONING

BACKGROUND

For many years, closed captioning technology has allowed hearing impaired individuals to better understand the spoken dialogue of media such as movies and television programs by displaying a text summary or transcription of the dialogue occurring in the media at the bottom the screen on which the media is displayed. In addition to aiding hearing impaired users, closed captioning is also utilized by non-native speakers of a language to better comprehend movies and television programs in that language.

One drawback with conventional closed captioning is that it occludes part of the movie or television program over which it is displayed, which in addition to being aesthetically unappealing, also potentially may interfere with the viewer's comprehension and enjoyment of the visual content of the media. This problem is particularly burdensome to non-native speakers who have sufficient language skill to understand most of the spoken dialog, and thus only occasionally encounter passages that they cannot understand. For these highly proficient non-native speakers, the closed captioning can be an annoyance during the portions of the program that are well understood.

With prior closed captioning technologies, such users have the option of turning closed captioning off, for example, by using a remote control to negotiate an on-screen menu of a playback device and setting closed captioning to OFF. However, after closed captioning is turned off the user may encounter a portion of the program with dialog that cannot be understood by the user. The user is forced to pick up the remote control, stop the program, turn closed captioning ON via the on-screen menu, rewind the program, and hit play again, in order to replay the misunderstood portion of the dialogue. For user viewing broadcast live television without a digital video recorder, even this labored sequence of commands is impossible, since the program cannot be rewound. As can be appreciated, it is awkward and cumbersome for a user to activate and deactivate closed captioning in this manner many times during a single viewing session.

SUMMARY

Systems and methods for controlling closed captioning using an eye tracking device are provided. The system for controlling closed captioning may comprise a display device, a closed captioning controller configured to display closed captioning text for a media item during playback on the display device, and an eye tracking device configured to detect a location of a user's gaze relative to the display device and send the location to the closed captioning controller. The closed captioning controller may be configured to recognize a predetermined gaze pattern of the user's gaze and, upon detecting the predetermined gaze pattern, partially or completely deemphasize the display of the closed captioning text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A-1G show a system to control closed captioning responding to various eye gaze patterns from a user in accordance with an embodiment of this disclosure.

FIGS. 3A-3C show the system of FIGS. 1A-1G further configured to control closed captioning responding to a user's gaze located in various subregions of a predetermined closed captioning display region in accordance with an embodiment of this disclosure.

FIGS. 4A-4D show the system of FIGS. 1A-1G further configured to control closed captioning responding to a user's gaze located on a character displayed on the display device in accordance with an embodiment of this disclosure.

DETAILED DESCRIPTION

Figure 1B:
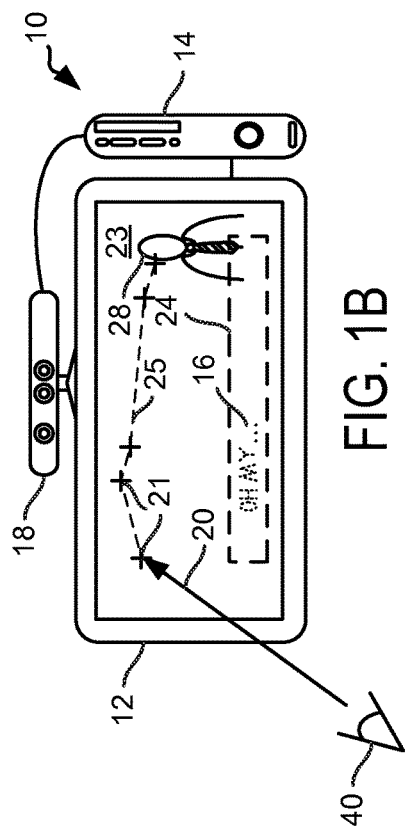

To address the challenges described above, systems and methods for controlling closed captioning using an eye tracking device are disclosed herein. FIGS. 1A-1G show a system 10 for controlling closed captioning responding to various eye gaze patterns from a user. As shown in FIG. 1A the system 10 may comprise a display device 12, a closed captioning controller 14 which may be configured to display closed captioning text 16 for a media item 23 during playback on the display device 12, and an eye tracking device 18 configured to detect a location 21 of a user's gaze 20 relative to the display device 12 and send the location to the closed captioning controller 14. As the user's gaze is tracked over a time interval, the closed captioning controller 14 may be configured to recognize a predetermined gaze pattern 25 (see FIG. 1B) of the user's gaze 20, based on a series of locations 21 at which the user's gaze is detected within the time interval. Upon detecting the predetermined gaze pattern, the closed captioning controller 14 may be configured to partially or completely deemphasize the display of the closed captioning text 16.

Deemphasizing the display of the closed captioning text 16 may be achieved by a suitable process used to make the closed captioning text 16 less visible to the user 40. For example, the closed captioning text 16 may completely deactivated or made less opaque, i.e., partially translucent or transparent. If deactivated, the deactivation is typically only temporary, until the user requests closed captioning again, as described below. Alternatively, the closed captioning text may be deemphasized by being made smaller, may be reproduced in a thinner font that occupies fewer pixels per character as compared to a default font, etc.

In FIGS. 1A-1G, the closed captioning controller 14 and the eye tracking device 18 are depicted as separate components from each other and from associated display device 12. It should be noted, however, that the system 10 is not limited to such a configuration. For example, the display device 12 and the closed captioning controller 14 may be integrated into a single housing, such as in a so-called smart television, tablet computer, or a head-mounted display.

Furthermore, the embodiments of the system 10 shown in FIGS. 1A-1G show a single user 40 and a single user's gaze 20. However, in practice, the system 10 may be configured to perform gaze tracking on multiple users simultaneously and may be further configured to utilize facial recognition, as well as various other heuristics, to identify multiple users of the system 10. The system 10 also may be configured to create and store profiles for each of a plurality of users. Such profiles may contain various forms of information including average reading speed, preferred language, or preferred font size of the closed captioning text 16 for each of the plurality of users. The system 10 may be configured such that profile information is input by the users, or determined by the system 10 based on the tracked behavior of each user over time.

Figure 1A:
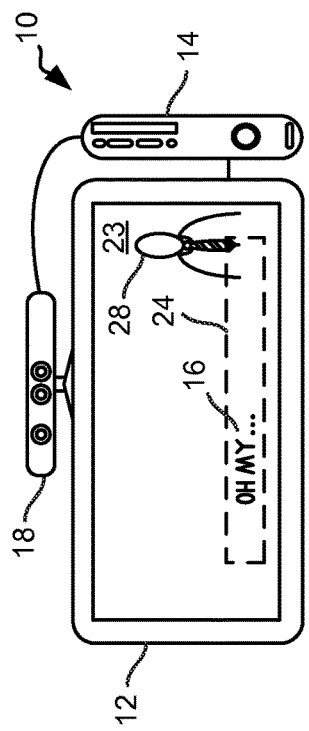

FIGS. 1A and 1B depict, respectively, the closed captioning controller 14 displaying and deemphasizing the closed captioning text 16 in response to a predetermined gaze pattern of the user's gaze 20. In order to recognize the predetermined gaze pattern, the closed captioning controller 14 may be further configured to determine whether or not the location 21 of the user's gaze 20 is within a predetermined closed captioning display region 24 on the display device 12 in which the closed captioning text 16 is displayed. Typically, it is determined whether the user's gaze is within the region 24 for a first predetermined period of time, referred to as an emphasis period, which may be, for example, between 2 and 5 seconds, or other length of time. As illustrated in FIG. 1B, if the detected location 21 of the user's gaze 20 is not within the predetermined closed captioning display region 24 for longer than a predetermined period of time, the controller 14 is configured to deemphasize the display of the closed captioning text 16 in the predetermined closed captioning display region 24. This de-emphasis is shown as pixelated text in FIG. 1B, which is in contrast to the solid lines of the closed captioning text in FIG. 1A. It will be appreciated that other forms of de-emphasis, such as those discussed above, may be applied.

FIGS. 1A-1G depict the predetermined closed captioning display region 24 as located at a bottom portion the display device 12. Alternatively, the predetermined closed captioning display region 24 may be located at any suitable location on the display device 12. While the predetermined closed captioning display region 24 typically overlaps the media item 23, it will be appreciated that in some formats, such as letterbox, the media item 23 may be displayed at less than full screen size, and the closed captioning display region 24 may be located in a matte region outside of media item 23. By deemphasizing the closed captioning text 16 when the user's gaze 20 is not located in the predetermined closed captioning display region 24, the system 10 may avoid displaying the closed captioning text 16 when it is not in use. Such a feature enhances the viewing experience of the closed captioning user 40, as well as any other viewers, by removing or decreasing the visibility of material that potentially obstructs or distracts from viewing media item 23 on the screen of the display device 12.

In a multi-user environment, the system 10 is configured to wait until the gaze of all users is detected to be outside the predetermined closed captioning display region 24 for the predetermined period of time, before causing the de-emphasis of the closed captioning text. This helps to ensure that the closed captioning text is not deemphasized in response to the averted gaze of one user when another user is still reading the text.

Figure 1C:
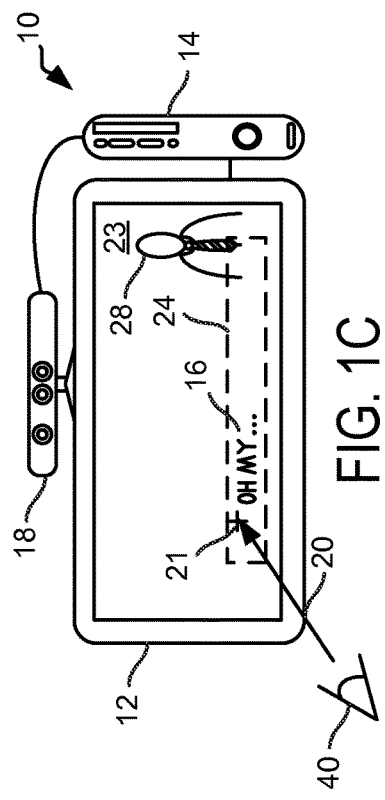

As shown in FIG. 1C, following deemphasizing of the closed captioning text 16, the closed captioning controller 14 may be further configured to reemphasize the display of the closed captioning text 16 in the predetermined closed captioning display region 24 if the location 21 of the user's gaze is detected to be within the predetermined closed captioning display region 24. Typically, the closed captioning text is reemphasized if the user's gaze is detected to be within the region 24 for longer than a second predetermined period of time, referred to as a reemphasis period, which may be, for example, 500 ms to 2 seconds, or other length of time. This helps avoid unintended switches as the user's eyes dart about the screen consuming visual content that may appear within the predetermined closed captioning display region 24. As an alternative, instead of waiting for the reemphasis period, the system may begin a fade-in gradually increasing the emphasis (e.g., opacity, size, thickness, etc.) of the closed captioning text as soon as the user's gaze is detected in the region 24. The reemphasis may be immediate, or gradual, such as a fading in of the close captioning text to a full emphasis. This feature allows the user 40 to view the closed captioning text 16 without accessing a remote control and turning the closed captions on again via an on-screen menu, as described above in the Background.

Turning now to FIGS. 1D-1G, in addition to the predetermined gaze patterns discussed above of gaze being outside or inside the region 24, the closed captioning controller 14 may be configured to detect the other predetermined gaze patterns when the user's gaze 20 is within the predetermined closed captioning display region 24. For example, the closed captioning controller 14 may be further configured to detect, based on information including the direction and rate of change of the user's gaze 20, that the user's eye gaze 20 is traveling within the predetermined closed captioning display region 24 in a reading direction at a filtered speed that is within a reading speed range.

FIG. 1D depicts a user's gaze 20 that is reading the closed captioning text 16 on the display device 12. As the user's gaze 20 moves from location 21 to locations 30 and 32, the closed captioning controller 14 may be configured to determine the direction the user's gaze 20 has moved over time. The closed captioning controller 14 may be further configured to determine if the direction is consistent with the reading direction for the language of the closed captioning text 16 (e.g. left to right for English or right to left for Hebrew or Arabic). Furthermore, the closed captioning controller 14 may be configured to calculate, based on the position of the user's gaze 20 over time, an average reading speed of the user 40. The closed captioning controller 14 may be further configured to filter out any sudden, rapid changes in the user's gaze 20 (e.g., saccades) that may occur while the user's gaze 20 is moving continuously in one direction. As such, the closed captioning controller 14 may be configured to obtain a smoothed, average rate of change for the user's gaze 20. The average reading speed of an adult fluent in a language is well known to be between 250 and 300 words per minute for that language, while language learners may read much slower. Thus the reading speed range described above may be between about 20 and 300 words per minute.

The closed captioning controller 14 may be configured to use statistics such as these in order to determine whether the rate of change of a user's gaze 20 over time is consistent with a user 40 reading the closed captioning text 16. For example, for each user of the system 10, statistics may be compiled for the average rate of reading the closed captioning text for that user, and if the actual rate of eye movement within region 24 is determined to vary from the user's own average reading rate by a percentage, for example 50%, then the reading speed is determined to be outside the reading speed range discussed above.

The closed captioning controller 14 may be further configured to deemphasize the closed captioning text 16 by decreasing the opacity of the closed captioning text 16 in the predetermined closed captioning display region 24 if the user's gaze 20 is within the predetermined closed captioning display region 24 but the filtered speed of user's gaze is detected to be outside the reading speed range. FIG. 1E depicts an instance where the user's gaze 20 is located within the predetermined closed captioning display region 24 but the user is focused on character 28 and not reading the closed captioning text 16, because the reading speed has been detected to be outside the reading speed range in the reading direction of the language of the closed captioning. There may be various points in a television program, for example, where the action of the program is occurring in the same area of the display device 12 as the predetermined closed captioning display region 24. The user's gaze 20 will naturally follow the action of the program and, therefore, may come to be located in the predetermined captioning display region 24. As described above, the closed captioning controller 14 may be configured to detect the direction and rate of change of the user's gaze 20 over time in order to determine whether or not the user is reading. When the closed captioning controller 14 determines that a user's gaze 20 is within the predetermined closed captioning display region 24, but the user 40 is not reading, it will be beneficial to the user 40 and any other viewers of display device 12 if the closed captioning text 16 is not displayed as fully opaque text. Therefore, the closed captioning controller 14 may be configured to reduce the opacity of the closed captioning text 16 when the user's gaze 20 is within the predetermined closed captioning display region 24 but the user 40 is not reading.

Figure 2:
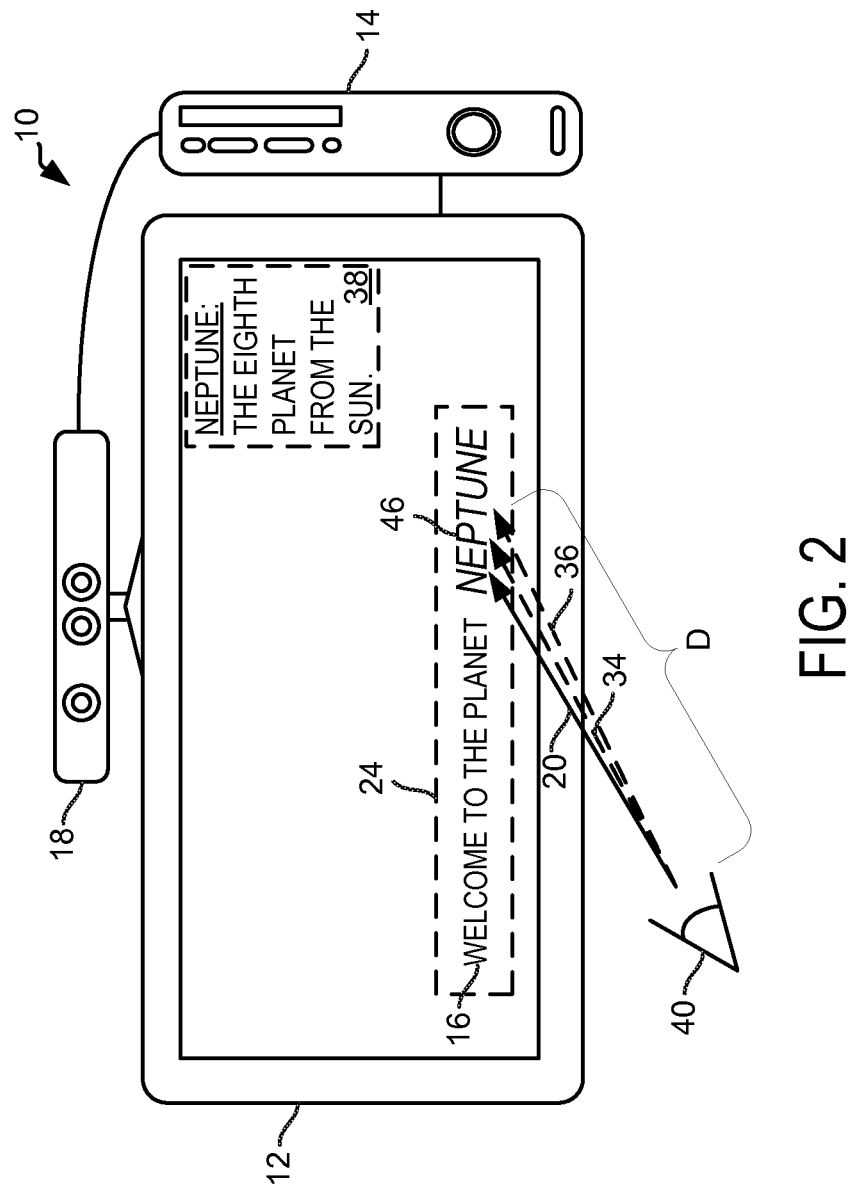
FIG. 2 shows the system of FIGS. 1A-1G further configured to control closed captioning responding to a user's gaze that dwells on a caption word in accordance with an embodiment of this disclosure.

Turning next to FIG. 2, in addition to monitoring whether or not the user 40 is reading, the closed captioning controller 14 may be configured to determine other gaze patterns. The closed captioning controller 14 may be configured to monitor the speed of the user's gaze 20 within the predetermined closed captioning display region 24 and display auxiliary information 38 regarding a word or phrase of the closed captioning text 16 if the closed captioning controller 14 detects that the speed of the user's gaze 20 slows down below a predetermined slow reading speed threshold or pauses for at least predetermined dwell time on the word or a word in the phrase in the closed captioning text 16.

FIG. 2 depicts a user's gaze that is dwelling on a caption word 46 in the closed captioning text 16. When a person reads, the person's eyes do not move continuously along the text. Rather, the user' gaze 20 will remain fixated on a single spot for a short time, then skips to a next spot in the text. The average fixation duration when reading is known to be between 200 and 250 milliseconds. Depending on other characteristics such as the person's age and average reading speed, the fixation duration can vary anywhere from 100 milliseconds to over 500 milliseconds. The closed captioning controller 14 may be configured to determine when a user's gaze 20 is dwelling on a word by calculating the fixation duration of the user's gaze 20 and comparing it to the average fixation duration of readers in general, as discussed above, or to an average fixation duration of the user 40 calculated by the closed captioning controller 14 over time. As some concrete examples, the predetermined dwell time discussed above may be 100-500 milliseconds, 200-400 milliseconds, or around 300 milliseconds, as some examples. The dwell time may also be set according to user input received from the user, to a desired dwell time. When a user is reading, the position of a user's gaze 20 will jump by a number of characters after each fixation. The average number of characters per jump is between 7 and 9 for those fluent in a language, but may range as much as 1 to 20. If a user's gaze 20 begins to jump fewer characters than previously detected during reading or if the fixation duration becomes longer than average for the user 40, the closed captioning control 14 may be configured to determine that a user's gaze 20 is has slowed below the predetermined slow reading speed threshold on a word or phrase in closed captioning text 16. FIG. 2 depicts an instance where the user's gaze 20 moves to positions 34 and 36, but dwells on caption word 46 (i.e. the word "NEPTUNE" in FIG. 2). In such a case, the closed captioning controller 14 may be configured to display auxiliary information 38 about caption word 46 to the user. If caption word 46 is unknown to the user, auxiliary information 38 may be particularly interesting or helpful in better understanding the closed captioning text 16. FIG. 2 depicts the auxiliary information 38 as a sidebar explaining the definition of caption word 46. Alternatively, auxiliary information 38 could be displayed anywhere on the display device 12 and could contain various forms of information, such as links to outside website or recent related news articles.

Prior to displaying the auxiliary information 38, the closed captioning controller may be further configured to alter at least one of the size or font of a word or phrase in the closed captioning text 16 if the controller 14 detects that the speed of the user's gaze 20 slows down below the predetermined slow reading speed threshold or pauses for at least predetermined dwell time on the word or a word in the phrase in the closed captioning text 16. FIG. 2 depicts an embodiment where the user's gaze 20 dwells on caption word 46 and, as a result, the word increases in size and changes to an italic font. Alternatively, the closed captioning controller 14 may be configured to distinguish words or phrases in the closed captioning text 16 by various other means (e.g. underlining, bolding, etc.) and is not limited to the particular type of stylization shown in FIG. 2.

Continuing with FIG. 2, the closed captioning controller 14 may be further configured to monitor a distance D between the user 40 and the display device 12 and increase a size of the closed captioning text 16 if the distance D increases and decrease the size of the closed captioning text 16 if the distance decreases. In addition to tracking the eye position of the user, closed captioning controller 14 may also be configured to monitor the position of a user 40 in relation to the display device 12 and determine the distance D between the user 40 and the display device 12. When there is a change in the distance D, the closed captioning controller 14 may be configured to adjust the size of the closed captioning text 16. For example, as shown FIG. 1F, if the user 40 moves closer to the display device 12, the closed captioning controller 14 may be configured to reduce the size of the closed captioning text 16. Likewise, as shown in FIG. 1G, if the user moves farther away from the display device 12, the closed captioning controller 14 may be configured to enlarge the size of the closed captioning text 16.

Turning now to FIG. 3A, the closed captioning controller 14 is further configured to define a plurality of adjacent subregions including a prior caption subregion 42 and a current caption subregion 44 within the predetermined closed captioning display region 24. The closed captioning controller 14 is configured to display a current caption of the closed captioning text 16 in the current caption subregion 44. Upon detecting the user's gaze within the prior caption subregion 42, the controller 14 is configured to display a previous caption of the closed captioning text in the prior caption subregion 42 and deemphasize the current caption in the current caption region 44. Upon detecting the user's gaze 20 within the current caption subregion 44, the closed captioning controller 14 is configured to deemphasize the prior caption in the prior caption subregion and reemphasize the current caption in the current caption subregion. The techniques for de-emphasis and reemphasis described above may be used in this context as well.

FIG. 3A depicts the predetermined closed captioning display region 24 including the prior caption subregion 42 positioned horizontally adjacent and on a left hand side of the current caption subregion 44, which is positioned in the center of the screen. The prior caption subregion may be on the left hand side of the current caption subregion for languages that read left to right, and on the right hand side of the current caption subregion for languages that read right to left. Other configurations such as the subregions being vertically adjacent each other are also possible. FIG. 3A further depicts a character 28 speaking a line of dialogue. The closed captioning controller 14 may be configured to display the current line of dialogue as the current caption in the current caption subregion 44 when the user's gaze 20 is directed to the current caption subregion 44. FIG. 3B depicts the character 28 speaking a subsequent line of dialogue. The closed captioning controller 14 may be configured to display the previous line of dialogue as a previous caption when the user's gaze 20 is located in the prior caption subregion 42, as shown in FIG. 3B. The closed captioning controller 14 may be further configured to display the current line of dialogue as the current caption when the user's gaze 20 is located in the current caption subregion 44, as shown in FIG. 3C. Such a feature enhances the user's ability to quickly catch missed dialogue. For example, the user 40 may view an entire line of missed dialogue by looking to the prior caption subregion 42 and then view the current caption by looking to the current caption subregion 44. FIGS. 3A-3C depict the previous and current captions as displayed within the prior caption subregion 42 and current caption subregion 44, respectively. However, in practice, the captions could be displayed at any suitable location on the display device 12. Turning now to FIG. 4A, the closed captioning controller 14 may be further configured to detect the user's gaze 20 upon a region in which a character is displayed on the display device 12, and, in response, display closed captioning text 16 corresponding to words spoken by the character 28. FIG. 4A depicts an embodiment of the system 10 in which the closed captioning controller 14 is configured to monitor the area around each character displayed on the display device 12. As shown in FIG. 4B, the closed captioning controller 14 may be further configured such that when the user's gaze 20 is located on the character 28, the closed captioning text 16 corresponding to that character's dialogue is displayed in the predetermined closed captioning display region 24. Such a feature may enhance the viewing experience of users viewing a media item in their non-native language. For example, the accent, dialect or speaking style of character 28 may make the character's dialogue particularly difficult to understand for a non-native speaker. In such a case, it would be beneficial for the user 40 if the character's dialogue were displayed in the predetermined closed captioning display region 24. The closed captioning controller 14 may be further configured to display dialogue for the character 28 when the user's gaze 20 moves from the character 28 to the predetermined closed captioning display region 24. Thus, for example, if a user 40 is viewing a television program and misses dialogue from character 28, the user 40 may look from the character 28 to the predetermined closed captioning display region 24 and view the missed dialogue.

As shown in FIG. 4C, the closed captioning controller 14 may be further configured to display the closed captioning text 16 when the user 40 looks from the character 28 to another predetermined area, such as location 48 below the display device 12. Alternately, as shown in FIG. 4D, the closed captioning controller 14 may be further configured to detect the user's gaze upon a region below the character displayed on the display device and display the closed captioning text 16, corresponding to words spoken by the character 28, if the user's gaze 20 moves from the region in which the character 28 is displayed on the display device to the region 50 below the character 28 in less than a predetermined period of time. The closed caption controller 14 may be configured such that the predetermined period of time is short enough to ensure that the user 40 is performing a quick "swipe down" type of gesture, and not simply looking at a different object or character on the display device 12. Turning next to FIG. 5, a flowchart of method 500 for controlling closed captioning is depicted. The methods described hereafter may be implemented on the hardware of system 10, described above with references to FIGS. 1-4, or on other suitable hardware. It will be appreciated that suitable hardware on which the methods described herein may be performed include video game consoles, smart televisions, laptop and desktop personal computers, smartphones, tablet computing devices, head-mounted displays, etc.

Figure 5A:
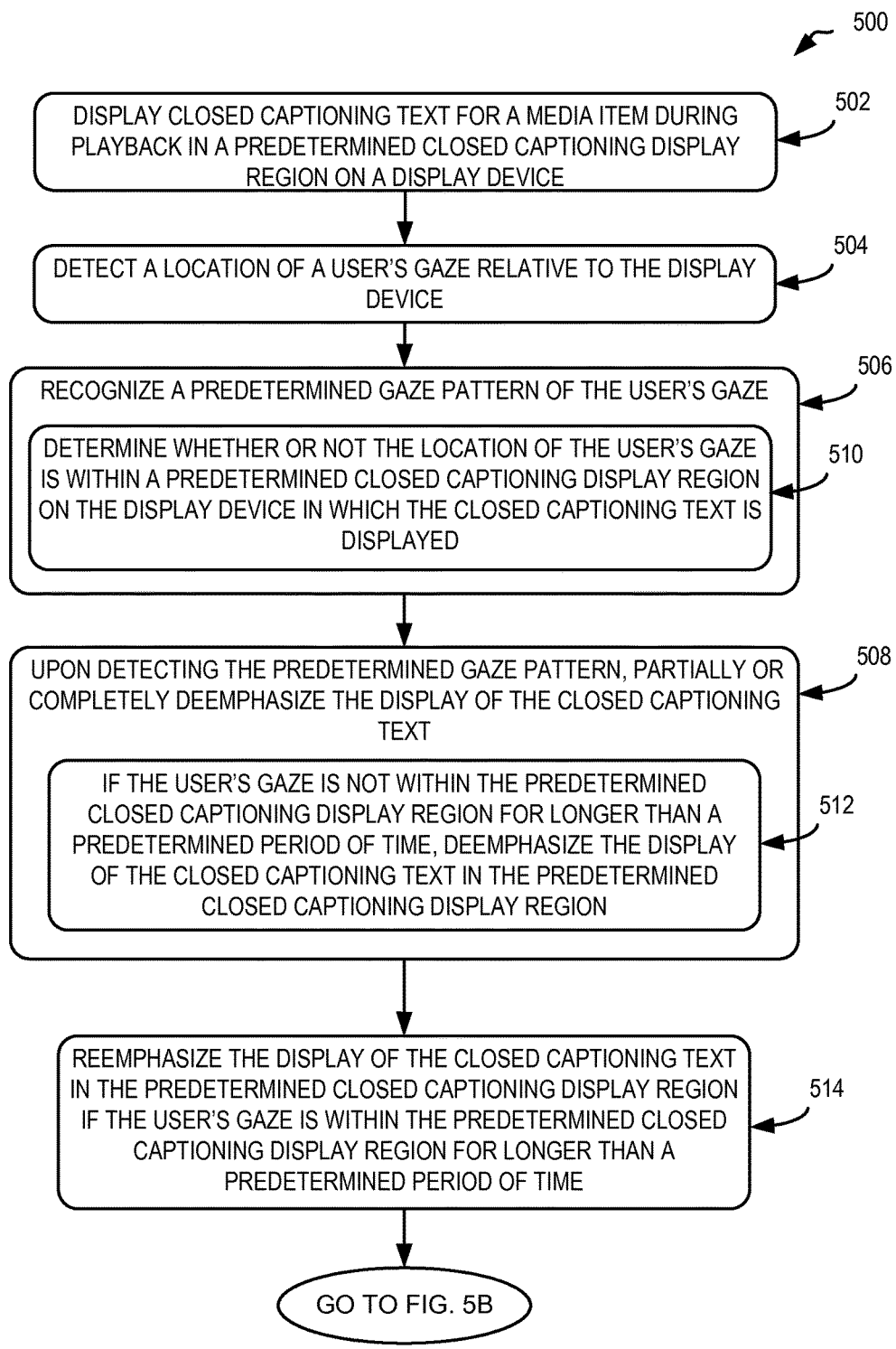
FIGS. 5A-5C are flowcharts of a method to control closed captioning in accordance with an embodiment of this disclosure.

With reference to FIG. 5A, at 502 the method 500 may include displaying closed captioning text for a media item during playback in a predetermined closed captioning display region on a display device. At 504, the method 500 may include detecting a location of a user's gaze relative to the display device. At 506, the method 500 may include recognizing a predetermined gaze pattern of the user's gaze.

At 508, the method 500 may include, upon detecting the predetermined gaze pattern, partially or completely deemphasizing the display of the closed captioning text.

As shown at 510, recognizing a predetermined gaze pattern at 506 may include determining whether or not the location of the user's gaze is within a predetermined closed captioning display region on the display device in which the closed captioning text is displayed. Further, as shown at 512, partially or completely deemphasizing the display of the closed captioning text at 508 may include, if the user's gaze is not within the predetermined closed captioning display region for longer than a predetermined period of time, deemphasizing the display of the closed captioning text in the predetermined closed captioning display region.

At 514, the method 500 may include reemphasizing the display of the closed captioning text in the predetermined closed captioning display region if the user's gaze is within the predetermined closed captioning display region for longer than a predetermined period of time.

Figure 5B:
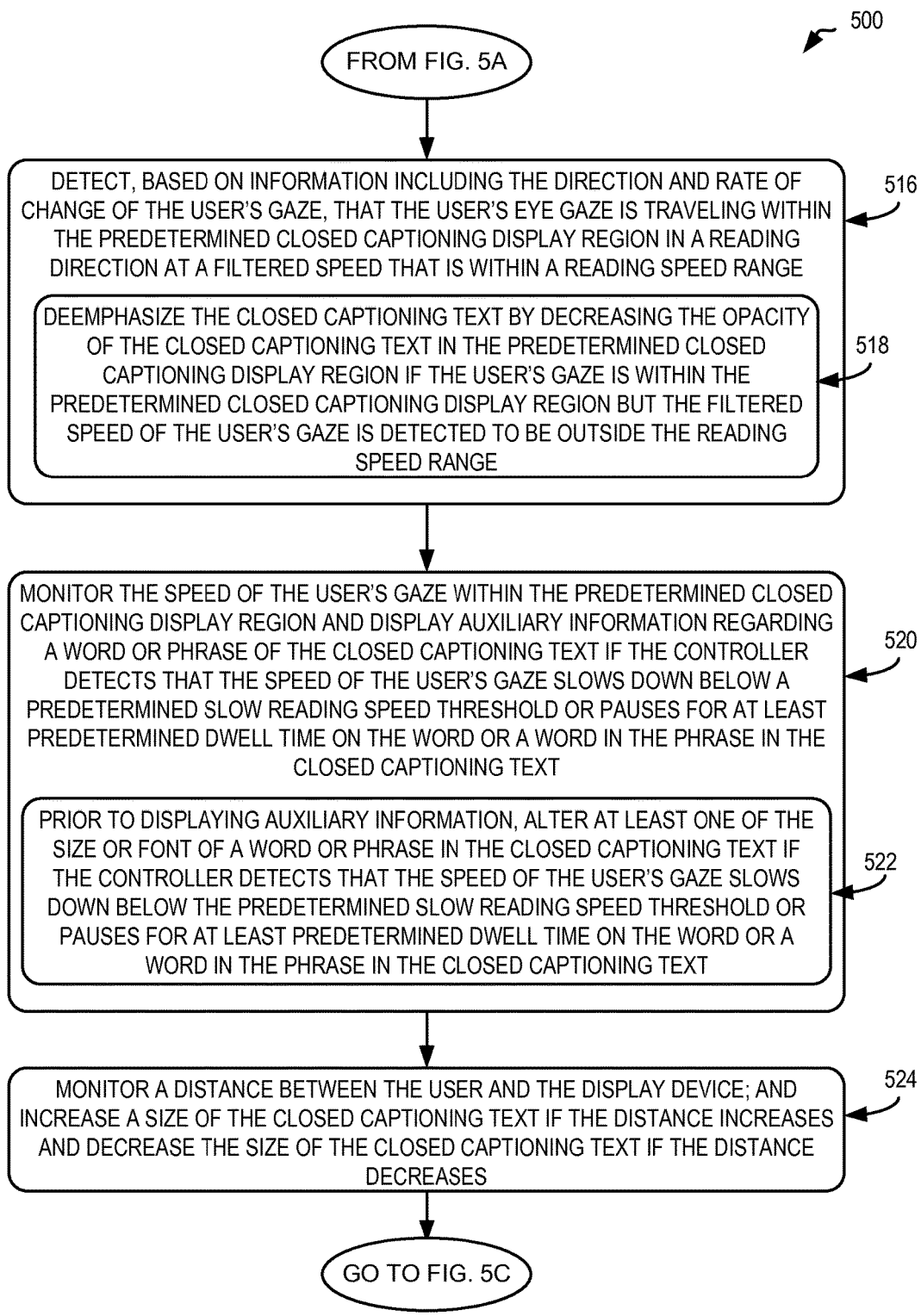

Turning next to FIG. 5B, the method 500 may include, at 516, detecting, based on information including the direction and rate of change of the user's gaze, that the user's eye gaze is traveling within the predetermined closed captioning display region in a reading direction at a filtered speed that is within a reading speed range.

At 518, the method 500 may include deemphasizing the closed captioning text by decreasing the opacity of the closed captioning text in the predetermined closed captioning display region if the user's gaze is within the predetermined closed captioning display region but the filtered speed of the user's gaze is detected to be outside the reading speed range.

At 520, the method 500 may include monitoring the speed of the user's gaze within the predetermined closed captioning display region and displaying auxiliary information regarding a word or phrase of the closed captioning text if the controller detects that the speed of the user's gaze slows down below a predetermined slow reading speed threshold or pauses for at least predetermined dwell time on the word or a word in the phrase in the closed captioning text.

At 522, the method 500 may include, prior to displaying the auxiliary information, altering at least one of the size or font of a word or phrase in the closed captioning text if the controller detects that the speed of the user's gaze slows down below the predetermined slow reading speed threshold or pauses for at least predetermined dwell time on the word or a word in the phrase in the closed captioning text.

At 524, the method 500 may include monitoring a distance between the user and the display device, and increasing a size of the closed captioning text if the distance increases and decreasing the size of the closed captioning text if the distance decreases.

Figure 5C:
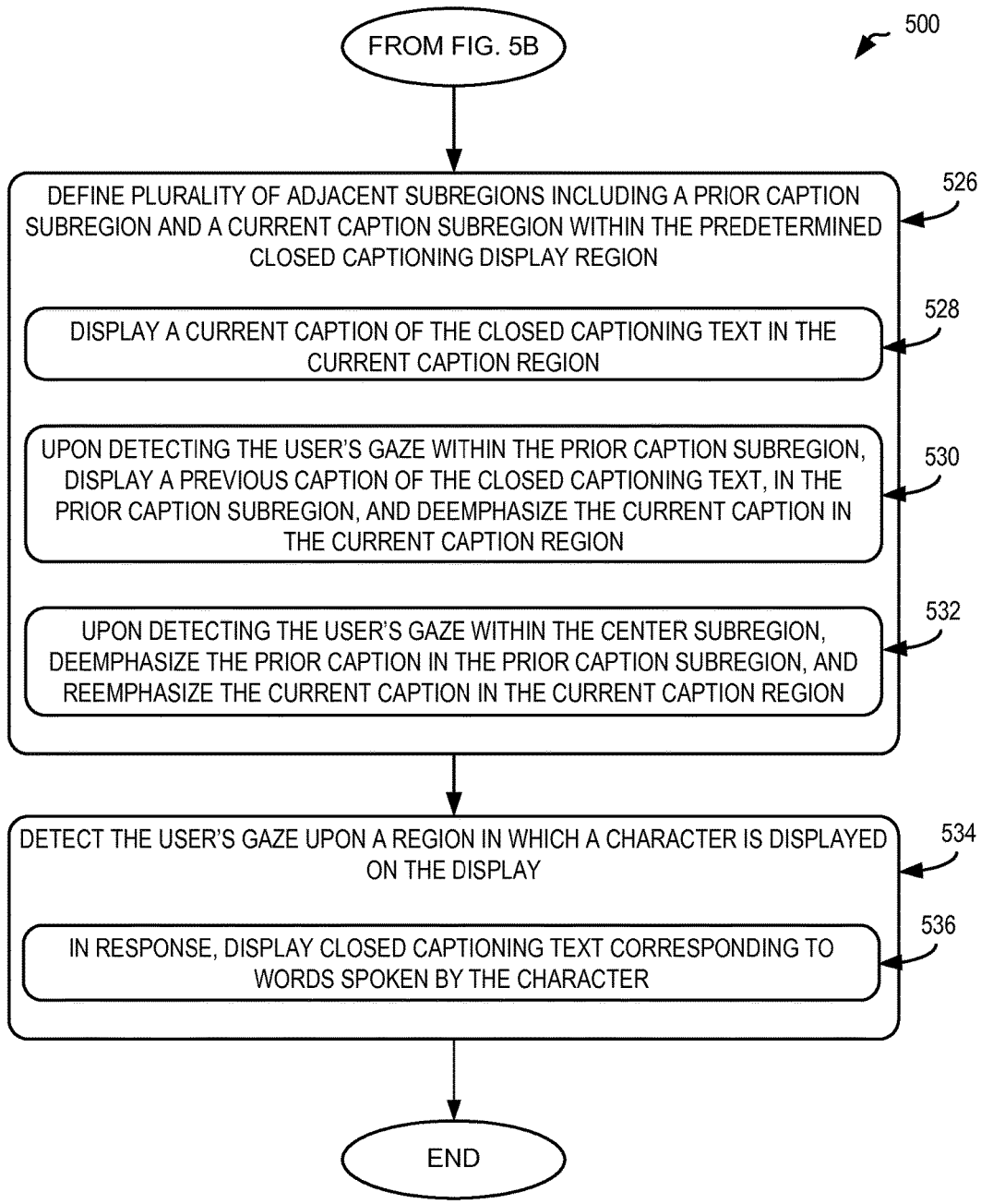

With reference to FIG. 5C, the method 500 may further include, at 526, defining plurality of adjacent subregions including a prior caption subregion and a current caption subregion within the predetermined closed captioning display region. At 528, the method 500 may include displaying a current caption of the closed captioning text in the current caption subregion. At 530, the method 500 may include, upon detecting the user's gaze within the prior caption subregion, displaying a previous caption of the closed captioning text in the previous caption region and deemphasizing the current caption in the current caption region. At 532, the method may include, upon detecting the user's gaze within the current caption subregion, deemphasizing the prior caption in the prior caption region, and reemphasizing the current caption in the current caption region. The techniques for de-emphasis and reemphasis may be similar to those described above. As described above, the prior caption subregion may be on the left hand side of the current caption subregion for languages that read left to right, and on the right hand side of the current caption subregion for languages that read right to left. The subregions may be horizontally adjacent in some embodiments. Other configurations are also possible, such as being adjacently arranged on top and bottom of each other.

At 534, the method 500 may include detecting the user's gaze upon a region in which a character is displayed on the display. At 536, the method 500 may include, in response, displaying closed captioning text corresponding to words spoken by the character.

It will be appreciated that method 500 is provided by way of example and is not meant to be limiting. Therefore, it is to be understood that method 500 may include additional and/or alternative steps than those illustrated in FIGS. 5A, 5B, and 5C. Further, it is to be understood that method 500 may be performed in any suitable order. Further still, it is to be understood that one or more steps may be omitted from method 500 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
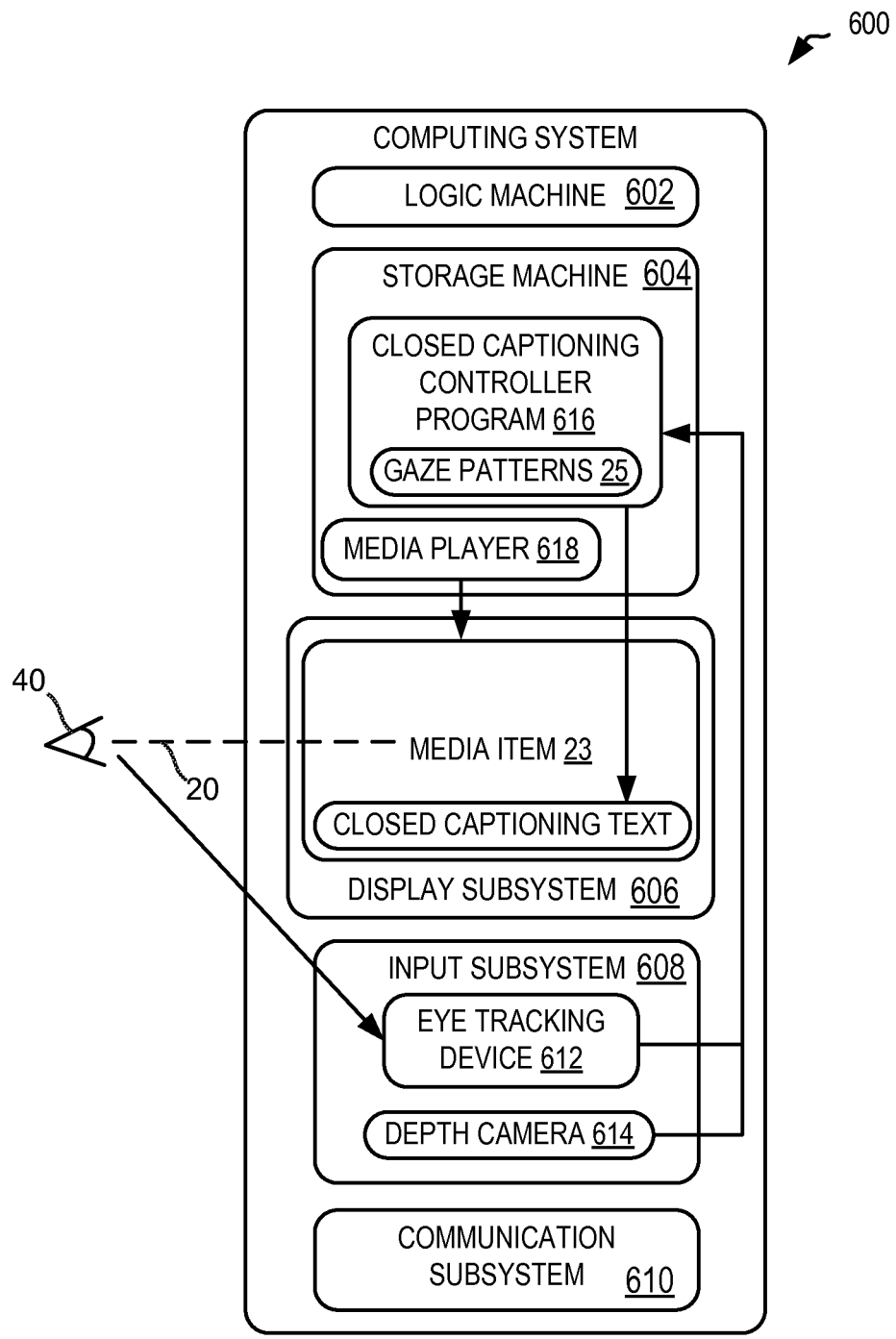
FIG. 6 shows schematically a computing system that can enact one or more of the methods and processes of the system of FIGS. 1A-1G.

FIG. 6 schematically shows a non-limiting embodiment of a computing system 600 that can enact one or more of the methods and processes described above, and thus serve to function as system 10 described above. Computing system 600 is shown in simplified form. Computing system 600 may take the form of a one or more hardware components, such as a smart television, a digital video recorder (DVR), a digital video disk (DVD) or BLU-RAY® player, a streaming media device, a cable television converter unit, a gaming device, a personal computer, a server, a tablet computer, a home-entertainment computer, a networked computing device, a mobile computing device, a mobile communication devices (e.g., smart phone), and/or other computing devices.

Computing system 600 includes a logic machine 602 and a storage machine 604 configured to store instructions executed by the logic machine 602. Computing system 600 may also include a display subsystem 606, input subsystem 608, and communication subsystem 610.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

In contrast to the storage machine 604 that includes one or more physical devices that hold the instructions for a finite duration, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 600 implemented to perform a particular function. In some cases, a module or program may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

Display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

Input subsystem 608 may comprise or interface with one or more user-input devices such as an eye tracking device 612 and depth camera 614, as well as a keyboard, mouse, touch screen, or game controller. The eye tracking device 612 may be configured to shine infrared (or other) light on a user and measure corneal reflections and also to image the pupil of each eye to ascertain its relative position, and based on the corneal reflections and pupil images to compute an estimate gaze of the user. Other suitable eye tracking technologies may also be used to detect the gaze of each user. The depth camera 614 may also project infrared (or other) light at the user and use structured light or time-of-flight sensing technologies to determine the distance to the user, as well as other objects in the field of view of the depth camera. The eye tracking device 612 and depth camera 614 may be integrated into a housing of a separate device such as eye tracking device 18, described above, or may be formed integral with the remaining components of computing system 600. The input subsystem may comprise or interface with selected natural user input (NUI) componentry, of which the eye tracking device 612 and depth camera 614 are two examples. Such componentry may be integrated or peripheral, and the transduction and/or processing of input actions may be handled on- or off-board. Example NUI componentry may include a microphone for speech and/or voice recognition; an infrared, color, stereoscopic, and/or depth camera 614 for machine vision and/or gesture recognition; a head tracker, eye tracker, accelerometer, and/or gyroscope for motion detection and/or intent recognition; as well as electric-field sensing componentry for assessing brain activity. The eye tracking device 612 and depth camera 614 may be housed in a single housing with the remaining components of computing system 600, or may be formed separately as illustrated in FIGS. 1A-1G, for example. Further, in some embodiments a head mount display unit may be provided as part of input subsystem 608 for users to wear. The head mounted display unit may have cameras equipped to image the display subsystem 606 and internal accelerometers and gyroscopes for determining head orientation and microphone arrays for determining directions of emitted sounds from display subsystem 606, and these inputs may be relied upon additionally or alternatively to determine the gaze on display subsystem 606 of each user wearing the head mount display unit.

In the illustrated embodiment, a closed captioning program controller 614 and media player 618 are shown stored in storage machine 604. These software programs can be executed by logic machine 602. When executed, the media player is configured to display the media item 23 on the display subsystem 606, and the closed captioning controller program 616 is configured to receive eye tracking data from eye tracking device 612 and depth camera data from depth camera 614, function as controller 14 and display closed captioning text in the various manners described above on display subsystem 606.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In the illustrated embodiment, a closed captioning program 612 and media player 614 are shown stored in storage machine 604. These software programs can be executed by logic machine 602. When executed, the media player is configured to display the media item 23 on the display subsystem 606. The closed captioning program 616 is configured to It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for controlling closed captioning, comprising:
   a display device;
   a closed captioning controller; and
   an eye tracking device configured to detect a location of a user's gaze relative to the display device, and send the location to the closed captioning controller;
   wherein the closed captioning controller is configured to recognize a predetermined gaze pattern of the user's gaze and, upon detecting the predetermined gaze pattern, partially or completely deemphasize the display of the closed captioning text;
   wherein the closed captioning controller is further configured to:
      detect the user's gaze upon a region in which a character is displayed on the display device;
      detect a swipe down eye gaze gesture in which the user's gaze is detected as moving from the region in which the character is displayed to a region below the character that is outside a predetermined closed captioning display region in which the closed captioning text is displayed; and
      in response to detecting the swipe down eye gaze gesture, display closed captioning text corresponding to words spoken by the character.

2. The system of claim 1, wherein, to recognize the predetermined gaze pattern, the closed captioning controller is further configured to determine whether or not the location of the user's gaze is within the predetermined closed captioning display region on the display device in which the closed captioning text is displayed, and if the user's gaze is not within the predetermined closed captioning display region for longer than a predetermined period of time, deemphasize the display of the closed captioning text in the predetermined closed captioning display region.

3. The system of claim 2, wherein, following deemphasizing of the closed captioning text, the closed captioning controller is further configured to reemphasize the display of the closed captioning text in the predetermined closed captioning display region if the user's gaze is within the predetermined closed captioning display region for longer than a predetermined period of time.

4. The system of claim 2, wherein, to recognize the predetermined gaze pattern, the closed captioning controller is further configured to detect, based on information including the direction and rate of change of the user's gaze, that the user's eye gaze is traveling within the predetermined closed captioning display region in a reading direction at a filtered speed that is within a reading speed range.

5. The system of claim 4, wherein the closed captioning controller is further configured to deemphasize the closed captioning text by decreasing the opacity of the closed captioning text in the predetermined closed captioning display region if the user's gaze is within the predetermined closed captioning display region but the filtered speed of the user's gaze is detected to be outside the reading speed range.

6. The system of claim 4, wherein the closed captioning controller is further configured to monitor the speed of the user's gaze within the predetermined closed captioning display region and display auxiliary information regarding a word or phrase of the closed captioning text if the controller detects that the speed of the user's gaze slows down below a predetermined slow reading speed threshold or pauses for at least predetermined dwell time on the word or a word in the phrase in the closed captioning text.

7. The system of claim 6, wherein the closed captioning controller is further configured to:
   prior to displaying the auxiliary information, alter at least one of the size or font of a word or phrase in the closed captioning text if the controller detects that the speed of the user's gaze slows down below the predetermined slow reading speed threshold or pauses for at least predetermined dwell time on the word or a word in the phrase in the closed captioning text.

8. The system of claim 2, wherein the closed captioning controller is further configured to:
   monitor a distance between the user and the display device; and
   increase a size of the closed captioning text if the distance increases and decrease the size of the closed captioning text if the distance decreases.

9. The system of claim 2, wherein the closed captioning controller is further configured to:
   define a plurality of adjacent subregions including a prior caption subregion and a current caption subregion within the predetermined closed captioning display region;
   display a current caption of the closed captioning text in the current caption subregion;
   upon detecting the user's gaze within the prior caption subregion, display a previous caption of the closed captioning text and deemphasize the current caption in the current caption subregion; and
   upon detecting the user's gaze within the current caption subregion, deemphasize the prior caption in the prior caption subregion and reemphasize the current caption in the current caption subregion.

10. A method for controlling closed captioning, comprising:
    detecting a location of a user's gaze relative to the display device;
    recognizing a predetermined gaze pattern of the user's gaze;
    upon detecting the predetermined gaze pattern, partially or completely deemphasizing the display of the closed captioning text;
       detecting the user's gaze upon a region in which a character is displayed on the display;
       detecting a swipe down eye gaze gesture in which the user's gaze is detected as moving from the region in which the character is displayed to a region below the character that is outside a predetermined closed captioning display region in which the closed captioning text is displayed; and
       in response to detecting the swipe down eye gaze gesture, displaying closed captioning text corresponding to words spoken by the character in the predetermined closed captioning display region on the display device.

11. The method of claim 10, further comprising:
    wherein recognizing the predetermined gaze pattern includes determining whether or not the location of the user's gaze is within the predetermined closed captioning display region on the display device in which the closed captioning text is displayed; and
    wherein partially or completely deemphasizing the display of the closed captioning text includes, if the user's gaze is not within the predetermined closed captioning display region for longer than a predetermined period of time, deemphasizing the display of the closed captioning text in the predetermined closed captioning display region.

12. The method of claim 11, further comprising:
reemphasizing the display of the closed captioning text in the predetermined closed captioning display region if the user's gaze is within the predetermined closed captioning display region for longer than a predetermined period of time.

13. The method of claim 11, further comprising:
detecting, based on information including the direction and rate of change of the user's gaze, that the user's eye gaze is traveling within the predetermined closed captioning display region in a reading direction at a filtered speed that is within a reading speed range.

14. The method of claim 13, further comprising:
deemphasizing the closed captioning text by decreasing the opacity of the closed captioning text in the predetermined closed captioning display region if the user's gaze is within the predetermined closed captioning display region but the filtered speed of the user's gaze is detected to be outside the reading speed range.

15. The method of claim 13, further comprising:
monitoring the speed of the user's gaze within the predetermined closed captioning display region and displaying auxiliary information regarding a word or phrase of the closed captioning text if the controller detects that the speed of the user's gaze slows down below a predetermined slow reading speed threshold or pauses for at least predetermined dwell time on the word or a word in the phrase in the closed captioning text; and, prior to displaying the auxiliary information, altering at least one of the size or font of a word or phrase in the closed captioning text if the controller detects that the speed of the user's gaze slows down below the predetermined slow reading speed threshold or pauses for at least predetermined dwell time on the word or a word in the phrase in the closed captioning text.

16. The method of claim 11, further comprising:
monitoring a distance between the user and the display device; and
increasing a size of the closed captioning text if the distance increases and decrease the size of the closed captioning text if the distance decreases.

17. The method of claim 11, further comprising:
defining plurality of adjacent subregions including a prior caption subregion and a current caption subregion within the predetermined closed captioning display region;
displaying a current caption of the closed captioning text in the current caption region;
upon detecting the user's gaze within the prior caption subregion, displaying a previous caption of the closed captioning text in the prior caption subregion and deemphasize the current caption in the current caption region; and
upon detecting the user's gaze within the current caption subregion, deemphasize the prior caption in the prior caption region and reemphasize the current caption in the current caption region.

18. A method for controlling closed captioning, comprising:
detecting a location of a user's gaze relative to the display device;
detecting the user's gaze upon a region in which a character is displayed on the display device;
detecting a swipe down eye gaze gesture in which the user's gaze is detected as moving from the region in which the character is displayed to a region below the character that is outside a predetermined closed captioning display region in which the closed captioning text is displayed; and
in response to detecting the swipe down eye gaze gesture, displaying closed captioning text corresponding to words spoken by the character in the predetermined closed captioning display region on the display device.

* * * * *